(12) United States Patent
Veshchikov

(10) Patent No.: US 10,657,057 B2
(45) Date of Patent: May 19, 2020

(54) SECURE SPECULATIVE INSTRUCTION EXECUTION IN A DATA PROCESSING SYSTEM

(71) Applicant: NXP B.V., Eindhoven (NL)

(72) Inventor: Nikita Veshchikov, Brussels (BE)

(73) Assignee: NXP B.V., Eindhoven (NL)

( * ) Notice: Subject to any disclaimer, the term of this patent is extended or adjusted under 35 U.S.C. 154(b) by 48 days.

(21) Appl. No.: 15/945,047

(22) Filed: Apr. 4, 2018

(65) Prior Publication Data

US 2019/0310941 A1 Oct. 10, 2019

(51) Int. Cl.
*G06F 12/08* (2016.01)
*G06F 12/0844* (2016.01)
*G06F 9/38* (2018.01)

(52) U.S. Cl.
CPC ............ *G06F 12/0844* (2013.01); *G06F 9/38* (2013.01); *G06F 9/3842* (2013.01); *G06F 2212/507* (2013.01)

(58) Field of Classification Search
CPC ................. G06F 12/0844; G06F 2212/507
See application file for complete search history.

(56) References Cited

U.S. PATENT DOCUMENTS

| | | | |
|---|---|---|---|
| 6,321,328 B1 | 11/2001 | Karp et al. | |
| 7,149,851 B1 * | 12/2006 | Rozas | G06F 12/0855 |
| | | | 711/141 |
| 7,225,299 B1 * | 5/2007 | Rozas | G06F 12/0804 |
| | | | 711/137 |
| 7,673,123 B2 | 3/2010 | Hastie et al. | |
| 8,943,273 B1 | 1/2015 | Jamil et al. | |
| 2002/0062426 A1 * | 5/2002 | Gomez | G06F 9/383 |
| | | | 711/138 |
| 2004/0154011 A1 * | 8/2004 | Wang | G06F 9/3009 |
| | | | 717/158 |
| 2005/0154805 A1 | 7/2005 | Steely et al. | |
| 2008/0184010 A1 * | 7/2008 | Uchiyama | G06F 9/3802 |
| | | | 712/207 |

(Continued)

FOREIGN PATENT DOCUMENTS

EP 1785846 A2 5/2007

OTHER PUBLICATIONS

Grisenthwaite, Richard; ARM Limited—Whitepaper "Cache Speculation Side-channels" Version 1.1; Jan. 2018; 13 Pages.

(Continued)

*Primary Examiner* — Ryan Bertram
(74) *Attorney, Agent, or Firm* — Daniel D. Hill

(57) ABSTRACT

A data processing system includes a processor, a cache memory, a speculative cache memory, and a control circuit. The processor is for executing instructions. The cache memory is coupled to the processor and is for storing the instructions and related data. A speculative cache is coupled to the processor and is for storing only speculative instructions and related data. The control circuit is coupled to the processor, to the cache memory, and to the speculative cache. The control circuit is for causing speculative instructions to be stored in the speculative cache in response to receiving an indication from the processor. Also, a method is provided for speculative execution in the data processing system.

16 Claims, 4 Drawing Sheets

(56) References Cited

U.S. PATENT DOCUMENTS

| | | | |
|---|---|---|---|
| 2009/0210663 A1* | 8/2009 | Sartorius | G06F 9/3844 |
| | | | 712/207 |
| 2009/0235057 A1 | 9/2009 | Fujisawa | |
| 2010/0205408 A1* | 8/2010 | Chung | G06F 9/466 |
| | | | 712/216 |
| 2013/0103908 A1* | 4/2013 | Chung | G06F 9/3834 |
| | | | 711/137 |
| 2014/0089592 A1* | 3/2014 | Biswas | G06F 12/0862 |
| | | | 711/133 |
| 2014/0122845 A1* | 5/2014 | Chung | G06F 9/528 |
| | | | 712/228 |
| 2014/0122846 A1* | 5/2014 | Vasekin | G06F 9/3806 |
| | | | 712/237 |
| 2015/0143047 A1 | 5/2015 | Hagersten et al. | |
| 2015/0378731 A1* | 12/2015 | Lai | G06F 9/30174 |
| | | | 712/30 |
| 2016/0179586 A1* | 6/2016 | Wang | G06F 9/528 |
| | | | 711/125 |
| 2017/0147498 A1* | 5/2017 | Kotera | G06F 9/3804 |
| 2019/0114422 A1* | 4/2019 | Johnson | G06F 9/30043 |
| 2019/0294546 A1* | 9/2019 | Agarwal | G06F 3/0611 |
| 2019/0339978 A1* | 11/2019 | Wallach | G06F 12/0891 |

OTHER PUBLICATIONS

Gruss, Daniel, et al.; "KASLR is Dead: Long Live KASLR" Graz University of Technology, Austria; Internet: https://gruss.cc/files/kaiser.pdf; 16 pages.

Kocher, Paul, et al.; "Spectre Attacks: Exploiting Speculative Execution" 2017; Internet: https://meltdownattack.com/; 16 Pages.

Lipp, Moritz, et al. ; "Meltdown ;" 2017 ; Internet: https://meltdownattack.com/; 16 Pages.

Turner, Paul; "Retpoline: a software construct for preventing branch-target-injection;" Downloaded from the Internet Feb. 1, 2018: https://support.google.com/faqs/answer/7625886?hl=en; 6 Pages.

\* cited by examiner

SECURE SPECULATIVE INSTRUCTION EXECUTION IN A DATA PROCESSING SYSTEM

BACKGROUND

Field

This disclosure relates generally to data processing, and more particularly, to securely performing a speculative instruction execution in a data processing system.

Related Art

To enable faster instruction execution, processors may use, for example, branch prediction and speculative execution. Branching instructions allow different parts of code to be executed depending on a condition. It may be the case that all of the data necessary to evaluate the condition is not yet available. For example, the data may need to be computed or may need to be fetched from memory. In this case, it may not be certain which part of the program will be executed next. To get a speed advantage, a processor may start executing one of the possible paths of the program. The processor starts by predicting which path is likely to be executed next and begins the execution. This type of execution may be referred to as speculative execution.

Cache design in many systems interacts with speculatively executed instructions in an insecure manner. Unfortunately, attackers have learned how to exploit the interaction between the cache memory and speculative execution in a recent class of attacks known as Spectre and Meltdown. Generally, this class of attacks uses various techniques to recover stored secrets in cache by measuring access timing through speculative execution. Existing countermeasures to these attacks do not resist every variation. Also, the existing countermeasures are typically implemented in software that reduces processor performance.

Therefore, a need exists for a countermeasure that prevents speculative execution from being used to discover secret data from cache while still providing the performance advantages of speculative execution.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
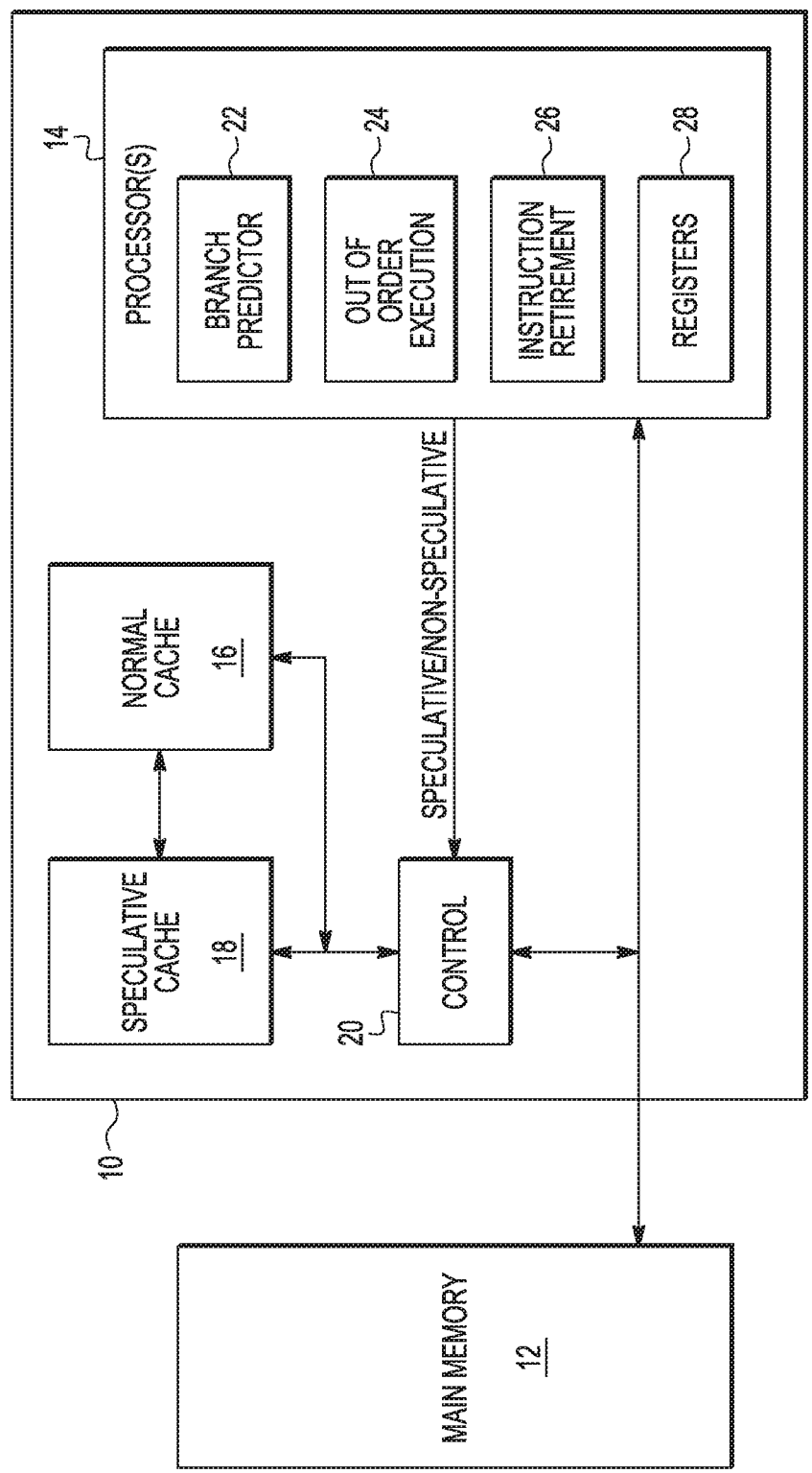
FIG. 1 illustrates a data processing system in accordance with an embodiment.

Generally, there is provided, a data processing system and a method in the data processing system for secure speculative instruction execution. The data processing system includes a speculative cache memory in addition to the normal cache memory. The speculative cache memory function is like the normal cache memory except that the speculative cache is only used for executing speculative instructions. Once the processor commits to the speculative instruction, the content of the speculative cache may be transferred to the normal cache memory.

The method and data processing system allows speculative execution in processors without leaving traces in the normal cache memory that can be exploited by an attacker, while still providing the speed gains provided by speculative execution.

In accordance with an embodiment, there is provided, a method for speculative execution in a data processing system, the method includes: receiving an instruction to be executed by a processor of the data processing system, wherein the instruction is for accessing a memory for reading or writing data according to the instruction; determining that the access is speculative; determining that the data is not in a cache memory of the data processing system; retrieving the data from a main memory; storing the data in a speculative cache, wherein the speculative cache is for storing only speculative instructions and data related to the speculative instructions; and executing the speculative instruction. Accessing a memory for reading or writing may further include accessing the memory for reading data, and further including transferring the data to a register. Accessing a memory for reading or writing may further include accessing the memory for writing data, and may further include overwriting the data in the speculative cache by new data from a register. The method may further include retiring the speculative instruction. The method may further include: retiring the speculative instruction; determining that there are changes to the speculative cache; and transferring data from the speculative cache to the cache memory. Accessing a memory for reading or writing may further include accessing the memory for reading data, and wherein determining that the data is not in a cache memory may further include determining that the data is not is the cache memory or the speculative cache. The method may further include preventing write operations to the cache memory during the speculative execution.

In another embodiment, there is provided, a data processing system including: a processor for executing instructions; a cache memory, coupled to the processor, for storing the instructions and related data; a speculative cache, coupled to the processor, for storing only speculative instructions and related data; and a control circuit, coupled to the processor, to the cache memory, and to the speculative cache, the control circuit for causing the speculative instructions to be stored in the speculative cache in response to receiving an indication from the processor. The processor may further include a branch predictor, wherein speculative execution may be performed in response to a prediction from the branch predictor regarding a speculative instruction. An instruction retirement circuit of the processor may retire the speculative instruction in response to the prediction being determined to be correct. The speculative cache and the cache memory may be separate portions of the same memory array. The processor may further include an instruction retirement circuit for retiring a speculative instruction after the speculative instruction is executed. The control circuit may prevent write operations to the cache memory during the speculative execution and only allow write operations to the speculative cache during the speculative execution.

In yet another embodiment, there is provided, a method for speculative execution in a data processing system, the method including: receiving an instruction to be executed by the processor, wherein the instruction is for accessing a memory for reading or writing data according to the instruction; determining that the access is speculative; preventing write operations to the cache memory during the speculative execution; determining that the data is not in a cache memory of the data processing system; retrieving the data from a main memory; storing the data in a speculative cache, wherein the speculative cache is for storing only speculative instructions and data related to the speculative instructions; and executing the speculative instruction. The instruction may be for a read access, and wherein the data may be transferred to a register of the processor. The instruction may be for a write access for writing data from a register of the processor to the speculative cache, and further include overwriting data in the speculative cache with the data from the register, and marking the data in the speculative cache as dirty. The method may further include retiring the speculative instruction. The method may further include: determining that there are changes to the data in the speculative cache; and transferring data from the speculative cache to the cache memory. Accessing a memory for reading or writing may further include accessing the memory for reading data, and wherein determining that the data is not in a cache memory may further include determining that the data is not in the cache memory or the speculative cache. Determining that the data is not in a cache memory may further include determining that the data is not in the cache memory or the speculative cache.

FIG. 1 illustrates a simplified block diagram of data processing system 10 in accordance with an embodiment. Data processing system 10 may be implemented on a single integrated circuit (IC), or on multiple ICs. Data processing system 10 includes processor(s) 14, normal cache 16, speculative cache 18, and control circuit 20. Data processing system 10 is connected to a main memory 12. In another embodiment, main memory 12 may be implemented as part of data processing system 10. Processor(s) 14 may be any type of processing circuit for executing instructions. For example, processor(s) 14 may be one or more microprocessors (MPUs), microcontrollers (MCUs), digital signal processors (DSPs), or another type of processor or processor core. Additionally, processor(s) 14 may be peripheral devices or special-purpose processors used to control peripheral units, such as for example, a direct memory access (DMA) peripheral. Processor(s) 14 is illustrated with blocks useful for describing various functions and aspects of the illustrated embodiment. For example, processor(s) 14 includes a branch predictor 22, out-of-order execution circuit 24, instruction retirement circuit 26, and registers 28. It is understood that a processor will have other functional blocks not illustrated in FIG. 1. Examples of other functional blocks include, but are not limited to, memory pages of random access memory (RAM), flash memory, and other types of non-volatile memory (NVM), an arithmetic logic unit (ALU), a debug interface, peripheral units such as a serial peripheral interface (SPI), analog-to-digital converter (ADC), controller area network (CAN), ethernet function block, and a DMA. There may also be system control functionality such as power management and system clock adjustment, additional system cores and coprocessors, etc. Registers 28 may include a plurality of registers that may be assigned to store various data and instructions by a programmer.

Normal cache memory 16 and speculative cache memory 18 are both bi-directionally connected to each other and to a control circuit 20. In one embodiment, normal cache memory 16 and speculative cache memory 18 may be separate portions of the same memory array. In another embodiment, there may be a hierarchical memory system with more than one level of cache. Cache memory 16 stores instructions and related data to be executed by processor(s) 14. Speculative cache 18 is for storing only speculative instructions and related speculative data to be executed by processor(s) 14. Control circuit 20 is bi-directionally connected to processor(s) 14 and main memory 12 to transmit and receive data and control signals. In addition, control circuit 20 receives a control signal from processor(s) 14 to indicate if an instruction is a speculative instruction or non-speculative instruction.

Speculative instructions may be executed in response to a prediction from branch predictor 22. Alternately, speculative execution may be in response to out-of-order execution controlled by out-of-order execution circuit 24. In one embodiment, in response to control circuit 20 receiving the control signal, control circuit 20 causes speculative instructions and related data to be stored only in the speculative cache. Also, the speculative instructions are only executed from speculative cache 18 and write operations are only allowed to speculative cache 18. Write operations to normal cache 16 and main memory 12 are prevented while the speculative instructions are being executed.

Figure 2:
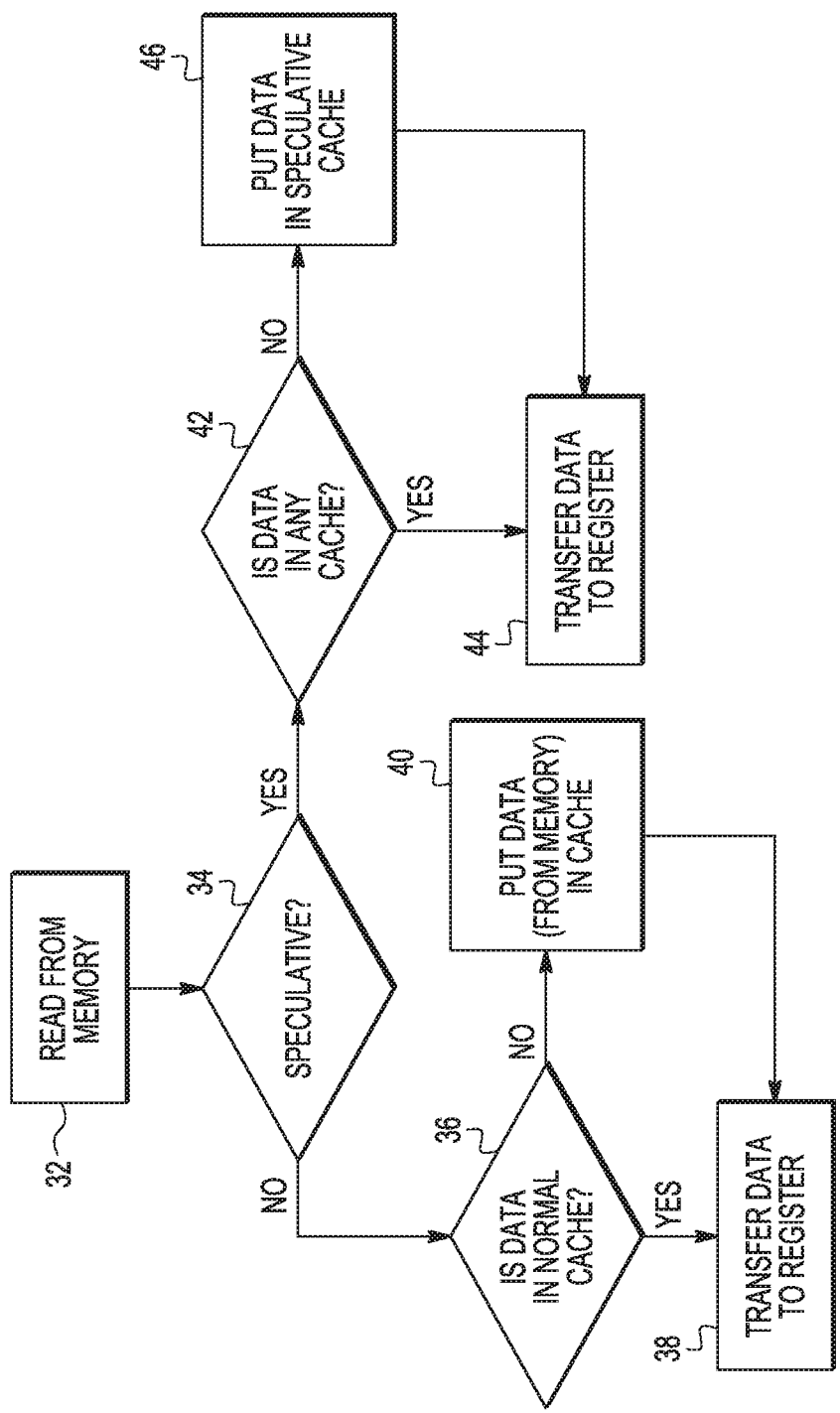
FIG. 2 illustrates a method for reading data from memory in accordance with an embodiment.

FIG. 2 illustrates method 30 for reading data from memory in accordance with an embodiment. The method may be performed by data processing system 10 during speculative execution. At step 32, a read instruction is received from memory. The memory being read may be any one of cache memory 16, speculative cache 18, or main memory 12. The read instruction may be to read an address from memory to a particular register of registers 28. At decision step 34, it is determined if the read instruction is speculative. The control signal provided to control circuit 20 from processor 14 provides the indication. If the read instruction is not speculative, the NO path is taken from decision step 34 to decision step 36. At decision step 36, it is determined if the requested data is in normal cache memory 16. If the data is in cache memory 16, then the YES path is taken to step 38 and the requested data is transferred to the particular register of registers 28. If at decision step 36 the data is not in the normal cache 16, then the NO path is taken to step 40. At step 40, the data is retrieved from main memory 12 and stored in cache memory 16. Note that the write to cache memory 16 is allowed because it has been determined that the instruction is not speculative. Then, at step 38, data is transferred from cache memory 16 to the particular register in processor(s) 14. However, if at decision step 34 it is determined that the instruction is speculative, the YES path is taken to decision step 42. At decision step 42, it is determined if the data is in any cache. In the illustrated embodiment, there is a speculative cache 18 and a normal cache 16. The available caches may be different in other embodiments. If the data is in one of caches 16 and 18, the data is transferred to the register. Note that writes to normal memory 16 are not allowed when speculative execution is ongoing. The speculative instruction is executed entirely within speculative cache 18 to prevent an attacker from retrieving information from normal cache memory 16.

Figure 3:
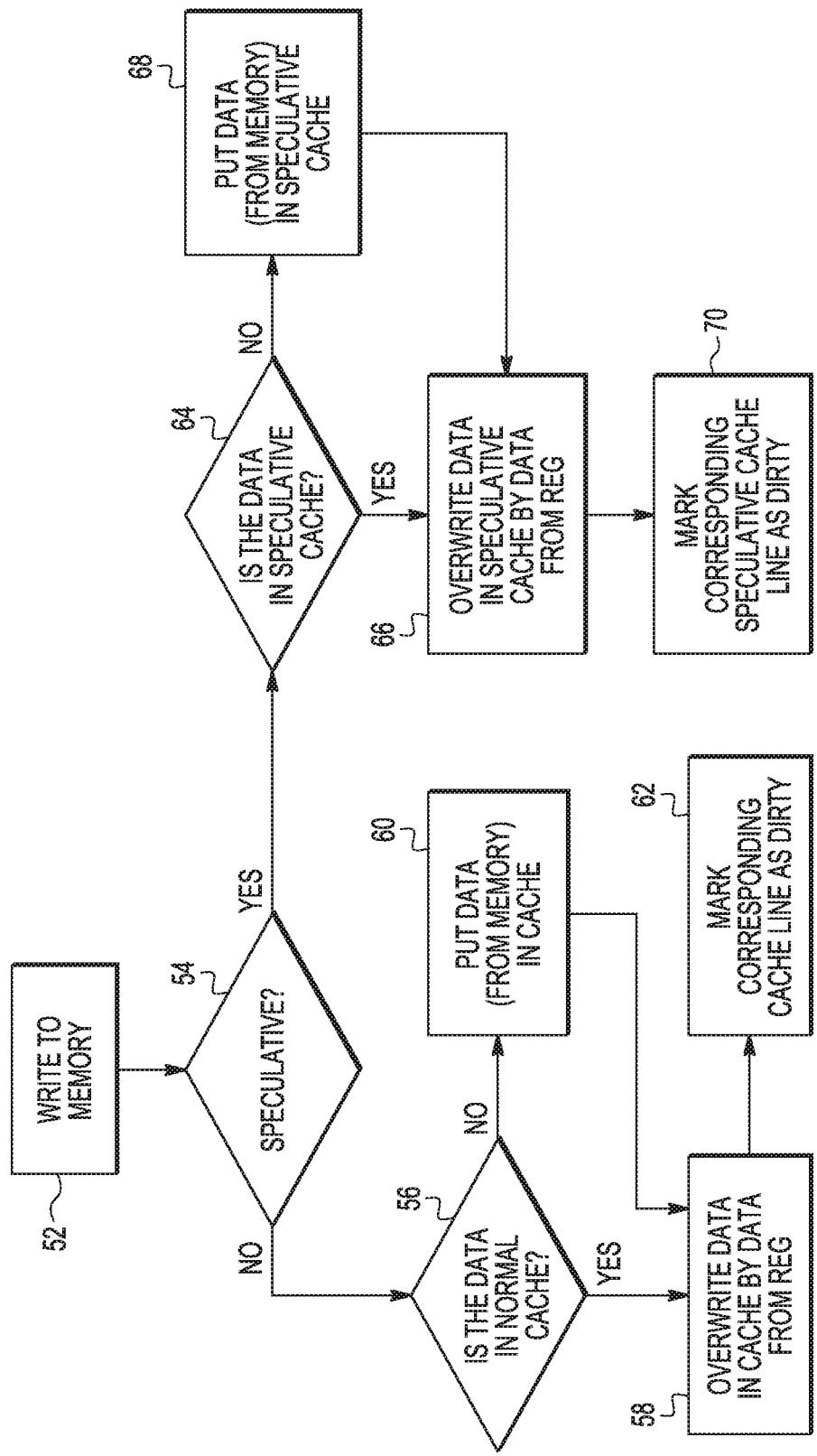
FIG. 3 illustrates a method for writing data to memory in accordance with an embodiment.

FIG. 3 illustrates method 50 for writing data to memory in accordance with an embodiment. Method 50 may be performed by data processing system 10 during speculative execution. At step 52, a write instruction is received. The memory being written to may be any one of cache memory 16, speculative cache 18, or main memory 12. The write instruction may be provided to write the contents of a particular register of registers 28 to an address in memory. At decision step 54, it is determined if the write instruction is speculative. If the write instruction is not speculative, the NO path is taken to decision step 56. At decision step 56, it is determined if the data is in cache memory 16. If the data is in cache memory 16, the data is overwritten by the data from the particular register, if necessary. At decision step 56, if it is determined that the data is not in cache memory 16, then the NO path is taken to step 60. At step 60, the data is retrieved from main memory 12 and stored in cache memory 16. At step 58, the data is overwritten by the data from the particular register. At step 62, the corresponding cache line in cache memory 16 is marked as dirty.

If at decision step 54 it is determined that the instruction is speculative, the YES path is taken to decision step 64. At decision step 64, it is determined if the data is already in speculative cache 18. If the data is already in speculative cache 18, the YES path is taken to step 66. At step 66, the data in speculative cache 18 is overwritten by data from the register. Note that, as discussed above, write operations to normal cache memory 16 are not allowed while speculative execution is proceeding. At step 70, the corresponding line in speculative cache 18 is marked as dirty. If at decision step 64, it is determined that the data is not in the speculative cache 18, the NO path is taken to step 68. At step 68, the data is stored in speculative cache 18 from main memory 12. Then method 50 proceeds to steps 66 and 70 where the data in speculative cache 18 is overwritten by data in the predetermined register of registers 28, and the corresponding speculative cache line is marked dirty.

Figure 4:
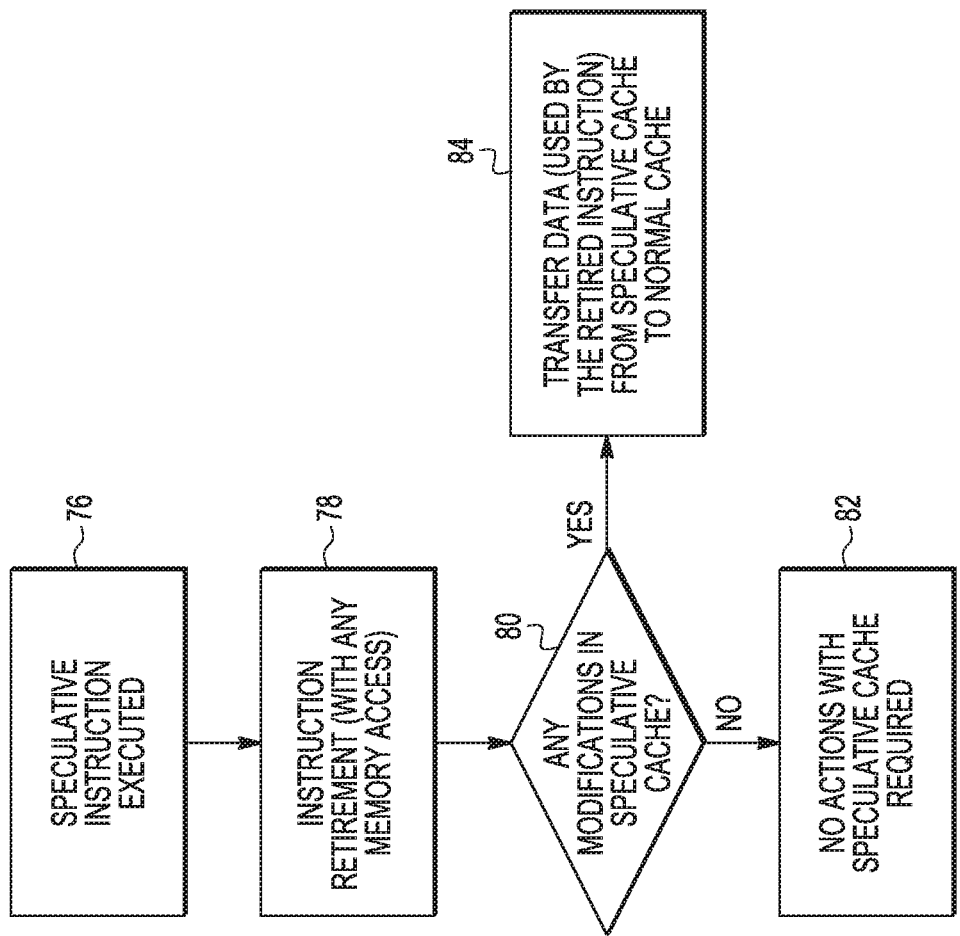
FIG. 4 illustrates a method for speculative instruction accordance with an embodiment.

FIG. 4 illustrates method 74 for speculative instruction retirement in accordance with an embodiment. Method 74 may be performed after either method 30 or method 50 depending on whether the instruction is a read or a write instruction. At step 76, the speculative instruction is executed. At step 78, the instruction is retired with any memory access being allowed because the speculative execution has been completed and the prediction of the branch predictor 22 was correct. On the other hand, when processor(s) 14 executes an instruction in a speculative manner and the instruction execution turns out to be unnecessary because of an incorrect prediction, all the results of the speculative execution are discarded. In another embodiment, in the case of an out-of-order execution, the instruction retirement indicates the instruction has been committed to. At decision step 80, it is determined if any modifications have made to speculative cache 18. If not, then the NO path is taken to step 82. At step 82, no further actions with respect to speculative cache 18 are required. If at decision step 80, it is determined that speculative cache 18 has been modified, then the YES path is taken to step 84. At step 84, data that was used by the instruction being retired is transferred from speculative cache 18 to cache memory 16.

The disclosed method and data processing system allows speculative execution in processors without leaving traces in the normal cache memory that can be exploited by an attacker, while still providing the speed gains provided by speculative execution.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. For example, the herein described embodiments may be applied to cases where an IC has several levels of cache memory, and each level may have a speculative cache. Also, any of the existing cache eviction algorithms may be used with both a speculative and a normal cache. In addition, any existing mechanism for cache management may be used with both the speculative and normal cache. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for speculative execution in a data processing system, the method comprising:
   receiving an instruction to be executed by a processor of the data processing system, wherein the instruction is for writing data to a memory according to the instruction;
   determining that the write access is speculative;
   preventing write operations to a cache memory during the speculative execution;
   determining that the data is not in the cache memory of the data processing system;
   determining that the data is not in a speculative cache;
   retrieving the data from a main memory;
   storing the data in a location of the speculative cache, wherein the speculative cache is for storing only speculative instructions and data related to the speculative instructions, and wherein the location in the speculative cache is overwritten with the data if necessary;
   marking a speculative cache line of the of the speculative cache as dirty;
   executing the speculative instruction from the speculative cache;
   determining that the speculative execution was due to a misprediction; and
   discarding all results of the speculative execution.

2. The method of claim 1, wherein accessing a memory for writing further comprises transferring the data from a register.

3. The method of claim 1, wherein writing data further comprising overwriting the data in the speculative cache by new data from a register.

4. The method of claim 1, further comprising determining that the speculative execution is due to a correct prediction, and retiring the speculative instruction.

5. The method of claim 1, further comprising:
retiring the speculative instruction;
determining that there are changes to the speculative cache; and
transferring data from the speculative cache to the cache memory.

6. A data processing system comprising:
a processor for executing instructions;
a cache memory, coupled to the processor, for storing the instructions and related data;
a speculative cache, coupled to the processor, for storing only speculative instructions and related data;
a control circuit, coupled to the processor, to the cache memory, and to the speculative cache, the control circuit for causing a currently pending speculative instruction and related data to be stored in the speculative cache in response to receiving an indication from the processor, wherein during speculative execution, write operations to the speculative cache are allowed while write operations to the cache memory are prevented, wherein a previously stored speculative instruction and related data of a speculative cache line is overwritten by the currently pending speculative instruction and related data if necessary; and
a branch predictor, wherein the speculative execution is performed in response to a prediction from the branch predictor, and wherein all results from the speculative execution are discarded in response to a misprediction of the speculative execution.

7. The data processing system of claim 6, wherein an instruction retirement circuit of the processor retires the speculative instruction in response to the prediction being determined to be correct.

8. The data processing system of claim 6, wherein the speculative cache and the cache memory are separate portions of the same memory array.

9. The data processing system of claim 6, wherein the processor further comprises an instruction retirement circuit for retiring a speculative instruction after the speculative instruction is executed.

10. A method for speculative execution in a data processing system, the method comprising:

receiving an instruction to be executed by the processor, wherein the instruction is for accessing a memory for writing an instruction and related data according to the instruction;
determining that the instruction and related data is speculative;
preventing write operations to a cache memory during the speculative execution;
preventing write operations to the cache memory during the speculative execution;
determining that the speculative instruction and related data is not in a cache memory of the data processing system;
retrieving the speculative instruction and related data from a main memory;
storing the speculative instruction and related data in a speculative cache, wherein the speculative cache is for storing only speculative instructions and data related to the speculative instructions, and wherein a previously loaded speculative instruction and related data in the speculative cache is overwritten if necessary;
executing the speculative instruction from the speculative cache;
determining that the speculative execution was due to a misprediction; and
discarding all results of the speculative execution.

11. The method of claim 10, wherein the data is transferred from a register of the processor.

12. The method of claim 10, further comprising marking the data in the speculative cache as dirty.

13. The method of claim 10, further comprising retiring the speculative instruction.

14. The method of claim 13, further comprising:
determining that there are changes to the data in the speculative cache; and
transferring data from the speculative cache to the cache memory.

15. The method of claim 10, wherein determining that the speculative instruction and related data is not in a cache memory further comprises determining that the data is not in the cache memory or the speculative cache.

16. The method of claim 10, wherein determining that the data is not in a cache memory further comprises determining that the data is not in the cache memory or the speculative cache.

* * * * *